128,476

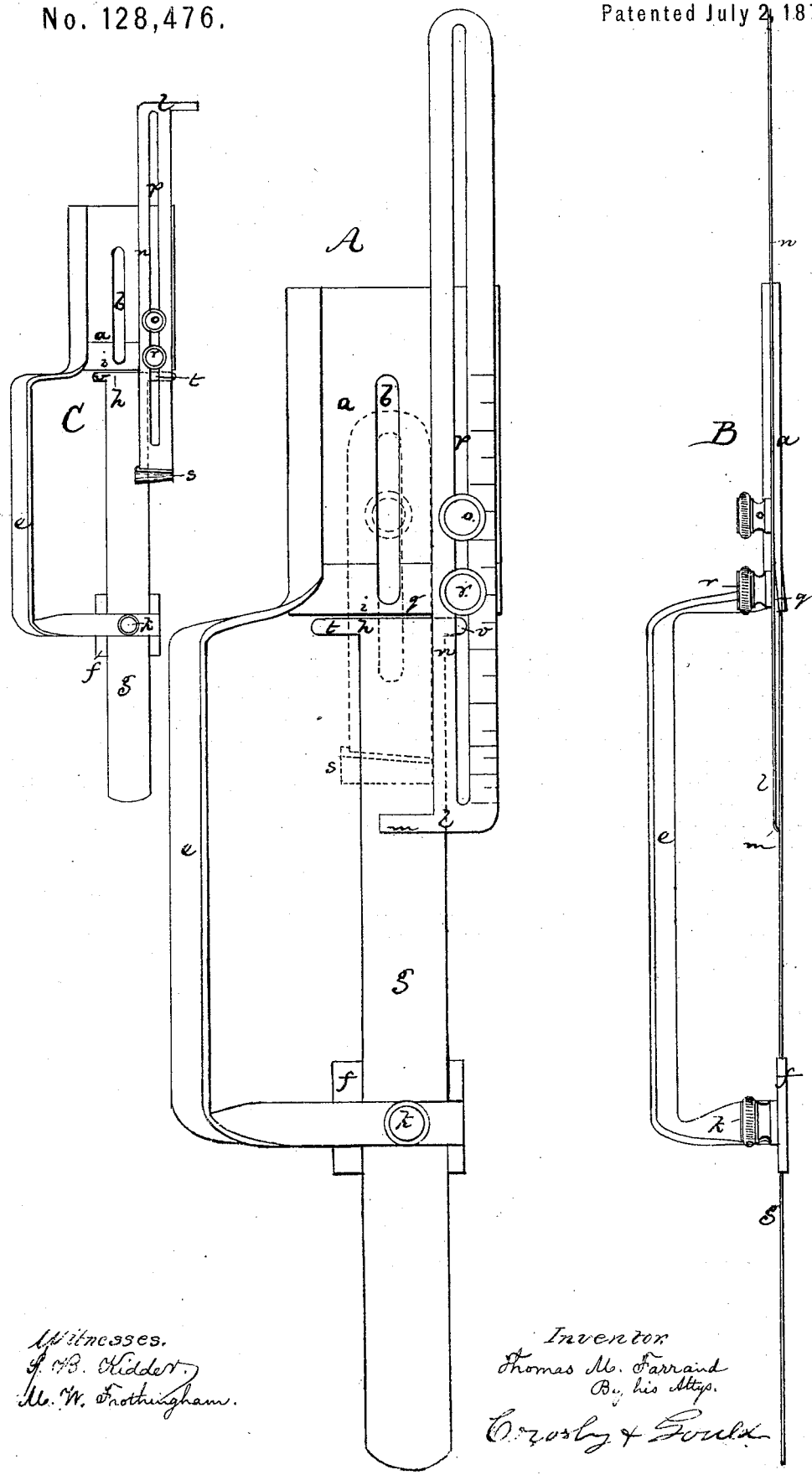

UNITED STATES PATENT OFFICE.

THOMAS M. FARRAND, OF BOSTON, MASSACHUSETTS, ASSIGNOR TO FARRAND MANUFACTURING COMPANY, OF SAME PLACE.

IMPROVEMENT IN TUCKING ATTACHMENTS.

Specification forming part of Letters Patent No. 128,476, dated July 2, 1872.

*To all whom it may concern:*

Be it known that I, THOMAS M. FARRAND, of Boston, in the county of Suffolk and State of Massachusetts, have invented an Improved Tucking Device; and I do hereby declare that the following, taken in connection with the drawing which accompanies and forms part of this specification, is a description of my invention sufficient to enable those skilled in the art to practice it.

United States Letters Patent No. 115,044 were granted to me for an improved tucking device. In such device the tucker-bar or guide is made with a bow for receiving the body of the work, at the edge or in proximity to the edge of which the tucks are to be formed, the shank of the bar extending from a plate clamped upon the sewing-machine table or work-supporting plate.

The drawing represents a tucking device embodying the invention.

A shows a plan of the parts. B, an edge view thereof. C shows a hemmer combined with the sliding guide or guide-bar. $a$ shows the adjustable clamp-plate, by which the devices are applied to a sewing-machine, this plate having a slot, $b$, through which extends the screw by which the plate is clamped to a sewing-machine work-supporting plate. From one side of this plate rises a bar, $e$, which is bent and extends forward, and is then bent down again, and has at its end a flat shoe or guide, $f$. In this guide is supported and slides the shank or tail-piece $g$ of the tuck guide or folder $h$, the edge of which extends nearly up to the front edge $i$ of the plate $a$. For convenience in introducing the work and adjusting it, and for facilitating the use of the device for work varying in thickness, the shank of the folder is made as a slide, and is confined in position by a set-screw, $k$. The work is passed under the shank $g$, between it and the work-supporting plate of the machine, the slack of the work or the body of the article to be tucked being beyond the shank and hanging at the side of the sewing-machine table. The edge to be tucked is slid up between the gauge $h$ and the edge $i$ of the plate $a$ and brought back over the shank $g$ until the work is in position for the entrance of the tuck-stitches, the plate $a$ being moved forward or back, in accordance with the width of tuck to be formed. Then the tuck-gauge $l$ is applied, this gauge having a down-turned lip, $m$, at the end of a long spring-shank, $n$, said shank being applied to the plate $a$ by a screw, $o$, that extends through the slot $p$ of the shank, and being adjustable to regulate the distance between adjacent tucks.

The work being drawn in so as to be in position for formation of the tuck, the shank $n$ is moved until the lip $m$ comes against the edge of the work or against the stitches of the previously-stitched tuck, said lip thus forming the guide against which the work is held in feeding it along to the action of the stitch-forming mechanism. The lip does not need to be pressed down hard upon the work, but should rest lightly against the top surface thereof; and to adjust the pressure for light or heavy work I make the plate $a$ with provision for increasing the pressure of the lip, as may be necessary. The thickness of the plate $a$ is such that the lip is held above the work, and the front end of the plate $a$ is made with an incline, $q$, into which incline extends the screw of a clamp-pin, $r$. The shank of the gauge extends over this incline, and the shank having been clamped by the screw $o$, the lip $m$ is pressed down more or less by forcing the shank $n$ more or less down toward the incline. By removing the tucking-gauge an adjustable hemmer, $s$, may be attached and used with the folder-slide $h$, said hemmer being slid forward or back in accordance with the width of hem desired.

Instead of making a separate hemmer the hemmer-guide may be formed at the end of the bar $g$ opposite to the tuck-folding edge $h$, as seen at C. In using the hemmer its shank may be fastened by one screw, and another screw be used for pressing it down and toward the incline $q$, the same as the shank of the tuck-gauge is fastened and adjusted.

In the use of hemmers, as the feed-bar (when a bottom-feed) acts only or principally upon the under part of the cloth, the said under part is fed faster than the upper part; but by pressing the hemmer-shank down toward the incline by the screw $r$ the folder-bar $h$ will be pressed down upon the under part of the cloth, and will act as a drag, so that by adjusting this pressure both parts of the cloth can be made to move in unison.

In making tucks it is desirable to have the tuck-folder extend as nearly as possible to the needle-line, and I therefore make the tuck-folder with an arm, $t$, the end of which extends out to said line. But when a very narrow tuck is to be made this arm comes in the way of the presser-foot, and to remedy this difficulty I make the tuck-folding bar reversible, and with a long arm, $t$, at one side, and a short arm, $v$, at the opposite side, using the arm $t$ when a wide tuck is to be made, and the arm $v$ only when a narrow tuck is to be made.

I claim—

1. In combination with the sliding folder-guide, the gauge-lip $m$ at the end of the shank $n$, said shank being formed as a spring, the pressure of which is adjusted by a screw, $r$, which presses the shank down upon or toward an incline, $q$, substantially as shown and described.

2. The clamp-plate $a$, formed with an incline, $q$, for enabling the pressure upon the shank of the tuck-gauge or upon the hemmer-shank to be adjustably regulated by the screw $r$, substantially as described.

Executed this 6th day of May, A. D. 1872.

THOMAS M. FARRAND.

Witnesses:
FRANCIS GOULD,
M. W. FROTHINGHAM.